(12) United States Patent
Boghani et al.

(10) Patent No.: US 9,737,082 B2
(45) Date of Patent: Aug. 22, 2017

(54) CHEWING GUM COMPOSITION COMPRISING ENCAPSULATED ACID

(71) Applicant: Intercontinental Great Brands LLC, East Hanover, NJ (US)

(72) Inventors: Navroz Boghani, Budd Lake, NJ (US); Petros Gebreselassie, Whitehouse Station, NJ (US); Kiran Vyakaranam, Morristown, NJ (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 233 days.

(21) Appl. No.: 14/680,538

(22) Filed: Apr. 7, 2015

(65) Prior Publication Data

US 2015/0223489 A1 Aug. 13, 2015

Related U.S. Application Data

(62) Division of application No. 14/114,344, filed as application No. PCT/US2012/035090 on Apr. 26, 2012, now Pat. No. 9,011,946.

(60) Provisional application No. 61/480,409, filed on Apr. 29, 2011.

(51) Int. Cl.
*A23G 4/20* (2006.01)
*A23G 4/06* (2006.01)

(52) U.S. Cl.
CPC .............. *A23G 4/20* (2013.01); *A23G 4/06* (2013.01); *A23G 4/066* (2013.01)

(58) Field of Classification Search
CPC .............................. A23G 4/20; A23V 2002/00
USPC ........................................................ 426/3, 5
See application file for complete search history.

(56) References Cited

U.S. PATENT DOCUMENTS

| | | | |
|---|---|---|---|
| 4,891,387 A | 1/1990 | Janda | |
| 4,904,482 A | 2/1990 | Patel et al. | |
| 4,911,934 A | 3/1990 | Yang et al. | |
| 4,915,958 A | 4/1990 | Faust et al. | |
| 4,918,182 A | 4/1990 | Jackson et al. | |
| 4,919,841 A | 4/1990 | Kamel et al. | |
| 4,923,684 A | 5/1990 | Ibrahim et al. | |
| 4,927,646 A | 5/1990 | Jenner et al. | |
| 4,929,447 A | 5/1990 | Yang | |
| 4,931,293 A | 6/1990 | Cherukuri et al. | |
| 4,933,190 A | 6/1990 | Cherukuri et al. | |
| 4,940,588 A | 7/1990 | Sparks et al. | |
| 4,952,402 A | 8/1990 | Sparks et al. | |
| 4,952,407 A | 8/1990 | Record et al. | |
| 4,954,353 A | 9/1990 | Cherukuri et al. | |
| 4,963,369 A | 10/1990 | Song et al. | |
| 4,971,797 A | 11/1990 | Cherukuri et al. | |
| 4,971,806 A | 11/1990 | Cherukuri et al. | |
| 4,976,972 A | 12/1990 | Patel et al. | |
| 4,978,537 A | 12/1990 | Song | |
| 4,981,698 A | 1/1991 | Cherukuri et al. | |
| 4,985,236 A | 1/1991 | Ibrahim et al. | |
| 4,986,991 A | 1/1991 | Yatka et al. | |
| 4,988,518 A | 1/1991 | Patel et al. | |
| 4,994,490 A | 2/1991 | Roy et al. | |
| 4,997,659 A | 3/1991 | Yatka et al. | |
| 5,004,595 A | 4/1991 | Cherukuri et al. | |
| 5,009,893 A | 4/1991 | Cherukuri et al. | |
| 5,017,385 A | 5/1991 | Wienecke | |
| 5,035,882 A | 7/1991 | Hussein et al. | |
| 5,041,294 A | 8/1991 | Patel | |
| 5,043,154 A | 8/1991 | Gaffar et al. | |
| 5,043,169 A | 8/1991 | Cherukuri et al. | |
| 5,057,327 A | 10/1991 | Yatka et al. | |
| 5,057,328 A | 10/1991 | Cherukuri et al. | |
| 5,059,429 A | 10/1991 | Cherukuri et al. | |
| 5,064,658 A | 11/1991 | Cherukuri et al. | |
| 5,073,389 A | 12/1991 | Wienecke | |
| 5,080,887 A | 1/1992 | Gaffar et al. | |
| 5,082,671 A | 1/1992 | Cherukuri | |
| 5,084,278 A | 1/1992 | Mehta | |
| 5,085,850 A | 2/1992 | Pan et al. | |
| 5,094,858 A | 3/1992 | Yatka et al. | |
| 5,096,699 A | 3/1992 | Gaffar et al. | |
| 5,096,701 A | 3/1992 | White, Jr. et al. | |
| 5,100,678 A | 3/1992 | Reed et al. | |
| 5,108,763 A | 4/1992 | Chau et al. | |
| 5,126,151 A | 6/1992 | Bodor et al. | |
| 5,139,793 A | 8/1992 | Johnson et al. | |
| 5,139,794 A | 8/1992 | Patel et al. | |
| 5,139,798 A | 8/1992 | Yatka et al. | |

(Continued)

FOREIGN PATENT DOCUMENTS

| | | |
|---|---|---|
| EP | 0203540 A1 | 5/1986 |
| EP | 0434321 A2 | 12/1990 |
| EP | 0446170 A2 | 2/1991 |
| EP | 0452273 A1 | 4/1991 |
| EP | 446170 A2 * | 11/1991 |
| EP | 1707058 A2 | 7/2003 |
| GB | 875763 | 8/1961 |
| GB | 1444024 | 7/1976 |
| GB | 1543167 | 3/1979 |
| GB | 2388581 A | 11/2003 |
| WO | 9004926 A1 | 5/1990 |
| WO | 9007859 A2 | 7/1990 |
| WO | 9013994 A2 | 11/1990 |

(Continued)

OTHER PUBLICATIONS

ES 2080703 A1, Publication date: Feb. 1, 1996, Abstract, 1 page.
ES 2190875 A1, Publication date: Aug. 16, 2003, Abstract, 1 page.
Patent Cooperation Treaty, International Bureau, Notification Concerning Availability of the Publication of the International Application, PCT/US2012/035090, dated Nov. 1, 2012, 1 page.

(Continued)

*Primary Examiner* — Jill Warden
*Assistant Examiner* — Bhaskar Mukhopadhyay
(74) *Attorney, Agent, or Firm* — Cantor Colburn LLP (57) ABSTRACT

Delayed release in chewing gum of a food-grade acid, is provided by encapsulating the food-grade acid in specific amounts of a poly(vinyl acetate) and a fatty acid salt. When incorporated into a chewing gum, the food-grade acid encapsulated in poly(vinyl acetate) and fatty acid salt provides a more delayed release of a sour flavor than food-grade acid encapsulated in poly(vinyl acetate) alone.

11 Claims, 2 Drawing Sheets

(56) References Cited

U.S. PATENT DOCUMENTS

| | | |
|---|---|---|
| 5,145,696 A | 9/1992 | Patel et al. |
| 5,154,939 A | 10/1992 | Broderick et al. |
| 5,158,790 A | 10/1992 | Witkewitz et al. |
| 5,164,210 A | 11/1992 | Campbell et al. |
| 5,169,657 A | 12/1992 | Yatka et al. |
| 5,169,658 A | 12/1992 | Yatka et al. |
| 5,174,514 A | 12/1992 | Prodi |
| 5,176,900 A | 1/1993 | White, Jr. et al. |
| 5,192,563 A | 3/1993 | Patel et al. |
| 5,198,251 A | 3/1993 | Song et al. |
| 5,206,042 A | 4/1993 | Dave et al. |
| 5,208,009 A | 5/1993 | Gaffar et al. |
| 5,223,282 A | 6/1993 | Patel et al. |
| 5,226,335 A | 7/1993 | Sitte et al. |
| 5,227,154 A | 7/1993 | Reynolds |
| 5,227,182 A | 7/1993 | Song et al. |
| 5,229,148 A | 7/1993 | Copper |
| 5,232,735 A | 8/1993 | Kurtz et al. |
| 5,240,710 A | 8/1993 | Bar-Shalom et al. |
| 5,244,670 A | 9/1993 | Upson et al. |
| 5,256,402 A | 10/1993 | Prencipe et al. |
| 5,266,335 A | 11/1993 | Cherukuri et al. |
| 5,266,336 A | 11/1993 | McGrew et al. |
| 5,266,592 A | 11/1993 | Grub et al. |
| 5,273,741 A | 12/1993 | Gafter et al. |
| 5,284,659 A | 2/1994 | Cherukuri et al. |
| 5,300,283 A | 4/1994 | Prencipe et al. |
| 5,300,305 A | 4/1994 | Stapler et al. |
| 5,334,375 A | 8/1994 | Nabi et al. |
| 5,334,396 A | 8/1994 | Yatka |
| 5,334,397 A | 8/1994 | Ream et al. |
| 5,336,509 A | 8/1994 | McGrew et al. |
| 5,336,513 A | 8/1994 | Riemer |
| 5,352,439 A | 10/1994 | Norfleet et al. |
| 5,364,627 A | 11/1994 | Song |
| 5,372,824 A | 12/1994 | Record et al. |
| 5,376,389 A | 12/1994 | Reed et al. |
| 5,378,131 A | 1/1995 | Greenberg |
| 5,380,530 A | 1/1995 | Hill |
| 5,385,729 A | 1/1995 | Prencipe et al. |
| 5,391,315 A | 2/1995 | Ashkin |
| 5,405,604 A | 4/1995 | Hall |
| 5,407,665 A | 4/1995 | McLaughlin et al. |
| 5,409,715 A | 4/1995 | Meyers |
| 5,413,799 A | 5/1995 | Song et al. |
| 5,415,880 A | 5/1995 | Song et al. |
| 5,425,961 A | 6/1995 | Yatka et al. |
| 5,429,827 A | 7/1995 | Song et al. |
| 5,431,930 A | 7/1995 | Patel et al. |
| 5,433,960 A | 7/1995 | Meyers |
| 5,437,876 A | 8/1995 | Synosky et al. |
| 5,437,879 A | 8/1995 | Kabse et al. |
| 5,441,749 A | 8/1995 | Meyers et al. |
| 5,451,404 A | 9/1995 | Furman |
| 5,458,879 A | 10/1995 | Singh et al. |
| 5,458,892 A | 10/1995 | Yatka et al. |
| 5,462,754 A | 10/1995 | Synosky et al. |
| 5,474,787 A | 12/1995 | Grey et al. |
| 5,480,668 A | 1/1996 | Nofre et al. |
| 5,487,902 A | 1/1996 | Andersen et al. |
| 5,494,685 A | 2/1996 | Tyrpin et al. |
| 5,494,689 A | 2/1996 | Lee et al. |
| 5,498,378 A | 3/1996 | Tsaur et al. |
| 5,501,864 A | 3/1996 | Song et al. |
| 5,503,823 A | 4/1996 | Norfleet et al. |
| 5,505,933 A | 4/1996 | Norfleet et al. |
| 5,523,098 A | 6/1996 | Synosky et al. |
| 5,525,360 A | 6/1996 | Yatka et al. |
| 5,538,742 A | 7/1996 | McHale et al. |
| 5,545,424 A | 8/1996 | Nakatsu et al. |
| 5,582,816 A | 12/1996 | Mandanas et al. |
| 5,589,160 A | 12/1996 | Rice |
| 5,589,194 A | 12/1996 | Tsuei et al. |
| 5,599,527 A | 2/1997 | Hsu et al. |
| 5,603,920 A | 2/1997 | Rice |
| 5,603,971 A | 2/1997 | Porzio et al. |
| 5,612,070 A | 3/1997 | Yatka et al. |
| 5,618,517 A | 4/1997 | Miskewitz |
| 5,626,892 A | 5/1997 | Kehoe et al. |
| 5,629,035 A | 5/1997 | Miskewitz |
| 5,633,027 A | 5/1997 | Cherukuri et al. |
| 5,637,334 A | 6/1997 | Yatka et al. |
| 5,637,618 A | 6/1997 | Kurtz et al. |
| 5,645,821 A | 7/1997 | Libin |
| 5,651,958 A | 7/1997 | Rice |
| 5,658,553 A | 8/1997 | Rice |
| 5,676,932 A | 10/1997 | Wason et al. |
| 5,679,397 A | 10/1997 | Kuroda et al. |
| 5,693,334 A | 12/1997 | Miskewitz |
| 5,698,215 A | 12/1997 | Kalili et al. |
| 5,702,687 A | 12/1997 | Miskewitz |
| 5,713,738 A | 2/1998 | Yarborough |
| 5,716,601 A | 2/1998 | Rice |
| 5,725,865 A | 3/1998 | Mane et al. |
| 5,741,524 A | 4/1998 | Staniforth et al. |
| 5,744,180 A | 4/1998 | Cherukuri et al. |
| 5,756,074 A | 5/1998 | Ascione et al. |
| 5,783,725 A | 7/1998 | Kuhn et al. |
| 5,789,002 A | 8/1998 | Duggan et al. |
| 5,795,616 A | 8/1998 | Greenberg |
| 5,800,848 A | 9/1998 | Yatka et al. |
| 5,824,291 A | 10/1998 | Howard |
| 5,834,582 A | 11/1998 | Sinclair et al. |
| 5,853,758 A | 12/1998 | Lo |
| 5,855,631 A | 1/1999 | Leas |
| 5,866,166 A | 2/1999 | Staniforth et al. |
| 5,869,028 A | 2/1999 | McGill et al. |
| 5,879,728 A | 3/1999 | Graff et al. |
| 5,912,007 A | 6/1999 | Pan et al. |
| 5,912,030 A | 6/1999 | Huzinec et al. |
| 5,939,051 A | 8/1999 | Santalucia et al. |
| 5,942,211 A | 8/1999 | Harper et al. |
| 5,952,019 A | 9/1999 | Yatka et al. |
| 5,958,472 A | 9/1999 | Robinson et al. |
| 6,027,746 A | 2/2000 | Lech |
| 6,027,758 A | 2/2000 | McHugh et al. |
| 6,056,992 A | 5/2000 | Lew |
| 6,074,084 A | 6/2000 | Kolossow |
| 6,077,502 A | 6/2000 | Witt et al. |
| 6,174,514 B1 | 1/2001 | Cherukuri et al. |
| 6,190,591 B1 | 2/2001 | van Lengerich |
| 6,190,644 B1 | 2/2001 | McClanahan et al. |
| 6,235,318 B1 | 5/2001 | Lombardy, Jr. et al. |
| 6,238,690 B1 | 5/2001 | Kiefer et al. |
| 6,241,973 B1 | 6/2001 | Rinne |
| 6,251,193 B1 | 6/2001 | Rossy et al. |
| 6,261,540 B1 | 7/2001 | Nelson |
| 6,264,999 B1 | 7/2001 | Yatka et al. |
| 6,265,203 B1 | 7/2001 | Ushiyama |
| 6,280,667 B1 | 8/2001 | Koenig et al. |
| 6,280,762 B1 | 8/2001 | Bealin-Kelly et al. |
| 6,280,780 B1 | 8/2001 | Degady et al. |
| 6,290,453 B1 | 9/2001 | Corniani et al. |
| 6,290,933 B1 | 9/2001 | Durga et al. |
| 6,290,985 B2 | 9/2001 | Ream et al. |
| 6,306,429 B1 | 10/2001 | Bealin-Kelly |
| 6,365,209 B2 | 4/2002 | Cherukuri |
| 6,368,651 B1 | 4/2002 | Gerlat et al. |
| 6,379,652 B1 | 4/2002 | Liu et al. |
| 6,390,098 B1 | 5/2002 | LaFontaine et al. |
| 6,413,573 B1 | 7/2002 | Reichart et al. |
| 6,416,744 B1 | 7/2002 | Robinson et al. |
| 6,428,827 B1 | 8/2002 | Song et al. |
| 6,436,461 B1 | 8/2002 | Bouwmeesters et al. |
| 6,436,899 B2 | 8/2002 | Portman |
| 6,444,241 B1 | 9/2002 | Tyrpin et al. |
| 6,461,658 B1 | 10/2002 | Merkel et al. |
| 6,468,962 B1 | 10/2002 | Portman |
| 6,471,945 B2 | 10/2002 | Luo et al. |
| 6,472,000 B1 | 10/2002 | Gudas et al. |
| 6,475,469 B1 | 11/2002 | Montgomery |
| 6,479,071 B2 | 11/2002 | Holme et al. |
| 6,485,739 B2 | 11/2002 | Luo et al. |
| 6,506,366 B1 | 1/2003 | Leinen et al. |

(56) References Cited

U.S. PATENT DOCUMENTS

| | | |
|---|---|---|
| 6,534,091 B1 | 3/2003 | Garces Garces et al. |
| 6,537,595 B1 | 3/2003 | Hyodo et al. |
| 6,555,093 B2 | 4/2003 | Alvarez Hernandez |
| 6,555,145 B1 | 4/2003 | Cherukuri |
| 6,558,690 B2 | 5/2003 | Portman |
| 6,558,722 B2 | 5/2003 | Corriveau et al. |
| 6,582,738 B2 | 6/2003 | Gubler |
| 6,586,023 B1 | 7/2003 | Song et al. |
| 6,592,912 B1 | 7/2003 | Barabolak et al. |
| 6,596,844 B2 | 7/2003 | Adams et al. |
| 6,599,542 B1 | 7/2003 | Abdel-Malik et al. |
| 6,623,266 B2 | 9/2003 | Jani et al. |
| 6,627,233 B1 | 9/2003 | Wolf et al. |
| 6,627,234 B1 | 9/2003 | Johnson et al. |
| 6,673,844 B2 | 1/2004 | Kumamoto et al. |
| 6,685,916 B1 | 2/2004 | Holme et al. |
| 6,692,778 B2 | 2/2004 | Yatka et al. |
| 6,716,815 B2 | 4/2004 | Portman |
| 6,717,167 B2 | 4/2004 | Noda |
| 6,759,066 B2 | 7/2004 | Savage et al. |
| 6,759,079 B2 | 7/2004 | Klug et al. |
| 6,761,879 B1 | 7/2004 | Finidori |
| 6,761,919 B2 | 7/2004 | Blyth et al. |
| 6,770,308 B2 | 8/2004 | Selestad et al. |
| 6,773,716 B2 | 8/2004 | Ream et al. |
| 6,780,443 B1 | 8/2004 | Nakatsu et al. |
| 6,835,895 B1 | 12/2004 | Asai et al. |
| 6,838,106 B2 | 1/2005 | Kumamoto et al. |
| 6,838,431 B2 | 1/2005 | Portman |
| 6,866,876 B2 | 3/2005 | Zuehlke et al. |
| 6,899,901 B2 | 5/2005 | Nakatsu et al. |
| 6,949,264 B1 | 9/2005 | McGrew et al. |
| 6,955,827 B2 | 10/2005 | Barabolak et al. |
| 6,955,887 B2 | 10/2005 | Adler et al. |
| 6,974,597 B2 | 12/2005 | Ohta et al. |
| 6,998,144 B2 | 2/2006 | Merkel et al. |
| 7,022,352 B2 | 4/2006 | Castro et al. |
| 7,025,999 B2 | 4/2006 | Johnson et al. |
| 7,041,277 B2 | 5/2006 | Holme et al. |
| 7,070,818 B1 | 7/2006 | Nielsen et al. |
| 7,189,760 B2 | 3/2007 | Erman et al. |
| 7,223,551 B2 | 5/2007 | Adler et al. |
| 7,241,880 B2 | 7/2007 | Adler et al. |
| 7,244,454 B1 | 7/2007 | Zyck et al. |
| 7,297,543 B2 | 11/2007 | Zoller et al. |
| 7,301,009 B2 | 11/2007 | Zoller et al. |
| 7,309,577 B2 | 12/2007 | Zoller et al. |
| 7,338,771 B2 | 3/2008 | Pronin et al. |
| 7,347,985 B2 | 3/2008 | Maxwell et al. |
| 7,364,903 B2 | 4/2008 | Zoller et al. |
| 7,368,285 B2 | 5/2008 | Zoller et al. |
| 7,396,651 B2 | 7/2008 | Adler |
| 7,416,751 B2 | 8/2008 | Yatka et al. |
| 7,419,791 B2 | 9/2008 | Adler et al. |
| 7,435,552 B2 | 10/2008 | Adler et al. |
| 7,445,769 B2 | 11/2008 | Holme et al. |
| 7,452,685 B2 | 11/2008 | Adler et al. |
| 7,476,399 B2 | 1/2009 | Tachdjian et al. |
| 7,507,427 B2 | 3/2009 | Andersen et al. |
| 7,524,637 B2 | 4/2009 | Adler et al. |
| 7,534,577 B2 | 5/2009 | Adler et al. |
| 7,585,516 B2 | 9/2009 | Pacetti |
| 7,658,998 B2 | 2/2010 | Brown et al. |
| 7,727,565 B2 | 6/2010 | Jani et al. |
| 7,838,055 B2 | 11/2010 | Eroma et al. |
| 7,850,990 B2 | 12/2010 | Tardi et al. |
| 7,851,005 B2 | 12/2010 | Bingley et al. |
| 7,851,006 B2 | 12/2010 | Bingley et al. |
| 8,017,060 B2 | 9/2011 | Benczedi et al. |
| 8,124,360 B2 | 2/2012 | Slack |
| 8,124,361 B2 | 2/2012 | Slack et al. |
| 2002/0113632 A1 | 8/2002 | Yatka et al. |
| 2003/0224087 A1 | 12/2003 | Lee |
| 2004/0115305 A1 | 6/2004 | Andersen et al. |
| 2005/0013915 A1 | 1/2005 | Riha et al. |
| 2005/0019445 A1 | 1/2005 | Wolf et al. |
| 2005/0037121 A1 | 2/2005 | Rathjen |
| 2005/0196503 A1 | 9/2005 | Srivastava |
| 2005/0196517 A1 | 9/2005 | Hodanko et al. |
| 2005/0202118 A1 | 9/2005 | Johnson et al. |
| 2005/0202143 A1 | 9/2005 | Roy et al. |
| 2005/0208084 A1 | 9/2005 | Ley et al. |
| 2005/0210306 A1 | 9/2005 | Rich et al. |
| 2005/0220934 A1 | 10/2005 | Leadbeater et al. |
| 2006/0057276 A1 | 3/2006 | Carcasona et al. |
| 2006/0147585 A1 | 7/2006 | Winckelmann et al. |
| 2006/0159820 A1 | 7/2006 | Rathjen et al. |
| 2006/0251768 A1 | 11/2006 | Bouquerand |
| 2007/0036733 A1 | 2/2007 | Spence et al. |
| 2007/0048424 A1 | 3/2007 | Moza et al. |
| 2008/0085247 A1 | 4/2008 | Langner et al. |
| 2009/0022846 A1 | 1/2009 | Wittorff et al. |
| 2009/0130250 A1 | 5/2009 | Andersen et al. |
| 2009/0148568 A1 | 6/2009 | Kawamura et al. |
| 2011/0097741 A1 | 4/2011 | Slack |

FOREIGN PATENT DOCUMENTS

| | | |
|---|---|---|
| WO | 9107104 A1 | 5/1991 |
| WO | 9202145 A1 | 2/1992 |
| WO | 9206160 A1 | 4/1992 |
| WO | 9322939 A1 | 11/1993 |
| WO | 9325177 A1 | 12/1993 |
| WO | 9500038 A1 | 1/1995 |
| WO | 9511671 A1 | 5/1995 |
| WO | 9533034 A1 | 5/1995 |
| WO | 9617524 A1 | 6/1996 |
| WO | 9619193 A1 | 6/1996 |
| WO | 9620608 A1 | 7/1996 |
| WO | 9702011 A1 | 1/1997 |
| WO | 9702273 A1 | 1/1997 |
| WO | 9706695 A1 | 2/1997 |
| WO | 9706774 A1 | 2/1997 |
| WO | 9724036 A1 | 7/1997 |
| WO | 9803076 A1 | 1/1998 |
| WO | 0001253 A1 | 1/2000 |
| WO | 0035296 A1 | 6/2000 |
| WO | 0035298 A1 | 6/2000 |
| WO | 0036924 A1 | 6/2000 |
| WO | 0069282 A1 | 11/2000 |
| WO | 0103513 A1 | 1/2001 |
| WO | 0149125 A1 | 7/2001 |
| WO | 0191571 A2 | 12/2001 |
| WO | 0247489 A1 | 6/2002 |
| WO | 02056698 A1 | 7/2002 |
| WO | 03063604 A1 | 8/2003 |
| WO | 03068000 A1 | 8/2003 |
| WO | 2004006967 A1 | 1/2004 |
| WO | 2004010998 A1 | 2/2004 |
| WO | 2004064544 A1 | 8/2004 |
| WO | 2004077956 A2 | 9/2004 |
| WO | 2005016022 A1 | 2/2005 |
| WO | 2005082154 A1 | 9/2005 |
| WO | 2006079056 A1 | 7/2006 |
| WO | 2006089200 A2 | 8/2006 |
| WO | 2007117870 A2 | 10/2007 |
| WO | 2012149088 A1 | 11/2012 |

OTHER PUBLICATIONS

Patent Cooperation Treaty, International Searching Authority, International Search Report; PCT/US2012/035090, dated Jul. 30, 2012; 5 pages.

Patent Cooperation Treaty, International Searching Authority, Written Opinion, PCT/US2012/035090, dated Jul. 30, 2012, 7 pages.

Shokuhin tenkabutsu kisokoza; Food Additives Basic Seminar (vol. 7), Food additives to form food products (3), Apr. 25, 2010, URL: http://www.asama-chemical.co.jp/TENKAB/YUKAWA7.HTM.

* cited by examiner

CHEWING GUM COMPOSITION COMPRISING ENCAPSULATED ACID

CROSS REFERENCE TO RELATED APPLICATION

This application claims the benefit of U.S. application Ser. No. 14/114,344 filed on Oct. 28, 2013, which claims the benefit of PCT Application No. PCT/US2012/035090 filed on Apr. 26, 2012, which claims the benefit of U.S. Provisional Application No. 61/480,409 filed on Apr. 29, 2011. All of these priority applications are incorporated herein by reference in their entireties.

BACKGROUND OF THE INVENTION

Chewing gum manufacturers have long endeavored to provide longer lasting flavors in chewing gums. In one approach to prolonging flavor, ingredients including flavors, sweeteners, and food-grade acids (to provide sourness) have been encapsulated with polymers to delay and prolong their release. See, for example, U.S. Pat. Nos. 4,931,293, 5,057,328, 5,064,658, and 5,110,608 to Cherukuri et al. In another approach, a flavor is extended by providing a chewing gum composition that includes a gum base, at least one flavor, and at least one encapsulated surfactant, where the surfactant increases the amount of flavor released from the chewing gum composition. See, for example, U.S. Patent Application Publication No. US 2006/0263474 A1 of Luo. However, delaying the release of food-grade acids has been particularly difficult, perhaps because of their extremely high water solubility. It has therefore been difficult to provide a long-lasting sour flavor. Moreover, with the current interest in flavor-changing chewing gums, it has not been possible to prepare an acceptable flavor-changing gum that features a sour flavor as the second or subsequent flavor of the gum. There is therefore a need for materials and methods capable of delaying and extending the release of food-grade acids in chewing gum.

BRIEF DESCRIPTION OF EMBODIMENTS OF THE INVENTION

One embodiment is a method of preparing a chewing gum composition comprising: melt blending about 30 to about 90 weight percent of a poly(vinyl acetate), about 5 to about 20 weight percent of a fatty acid salt, and about 5 to about 50 weight percent of a food-grade acid to form an encapsulated food-grade acid; wherein all weight percents are based on the total weight of the encapsulated food-grade acid; and melt blending a gum base, a sweetener, and the encapsulated food-grade acid to form a chewing gum composition.

Another embodiment is a chewing gum composition comprising: a gum base; a sweetener; and an encapsulated food-grade acid comprising, based on the weight of the encapsulated food-grade acid, about 30 to about 90 weight percent of a poly(vinyl acetate), about 5 to about 20 weight percent of a fatty acid salt, and about 5 to about 50 weight percent of a food-grade acid.

Another embodiment is a method of preparing an encapsulated food-grade acid comprising: melt blending about 35 to about 50 weight percent of a poly(vinyl acetate) having a weight average molecular weight of at least 30,000 atomic mass units, about 5 to about 15 weight percent of a fatty acid salt, and about 5 to about 50 weight percent of a food-grade acid to form an encapsulated food-grade acid; wherein all weight percents are based on the total weight of the encapsulated food-grade acid composition.

These and other embodiments are described in detail below.

DETAILED DESCRIPTION OF THE INVENTION

The present invention is directed to compositions and methods of preparing a food-grade acid encapsulated in poly(vinyl acetate) and a fatty acid salt and to chewing gum compositions containing the same that can provide the end-user with a prolonged or delayed taste experience. More specifically, upon mastication the user can experience a prolonged and/or delayed release of flavorings, sweeteners, and food acids while maintaining a soft chew texture of the gum. For example, to extend the perception of sourness a greater amount of encapsulated food acid must be incorporated into the chewing gum, which incorporates more polymer, such as poly(vinyl acetate), into the chewing gum base as the chewing gum is masticated. This in turn deteriorates the late chew texture by hardening the chewing gum bolus. Thus, with current interest in longer lasting sourness in chewing gums it has not heretofore been possible to prepare an acceptable long lasting flavor gum that features an extended sour flavor without the subsequent hardening of the chewing gum bolus. Due to the ability to delay or prolong the release of food-grade acids, the present invention can further provide a sequential flavor-changing experience wherein the sour flavor can be sensed as the second or subsequent flavor of the gum.

According to the present invention it has unexpectedly been found that encapsulating a food-grade acid in poly(vinyl acetate) and a fatty acid salt can extend or delay the release of the food grade acid. The poly(vinyl acetate) and fatty acid salt encapsulated food-grade acids can further be incorporated into a chewing gum composition in order to more precisely control the intensity of and timing of the sour flavor as experienced by the end-user without deteriorating the late chew texture of the chewing gum. The use of about 5 to about 15 weight percent fatty acid salt was important to achieve the desired combination of reduced gum hardness at long chewing times and encapsulated acid with physical integrity. When the fatty acid salt amount was significantly less than 5 weight percent, the increase in hardness at long chewing times was not sufficiently moderated. And when the fatty acid salt amount was significantly greater than 15 weight percent, a free fatty acid formed as a liquid and physically separated from the solid encapsulated food-grade acid.

In one embodiment there is an encapsulated food-grade acid that contains poly(vinyl acetate), a fatty acid salt, and a food-grade acid. In another embodiment, the encapsulated food-grade active ingredient is incorporated into a chewing gum that further includes a gum base and a sweetener.

One embodiment is a method of preparing a chewing gum composition comprising: melt blending about 30 to about 90 weight percent of a poly(vinyl acetate), about 5 to about 20 weight percent of a fatty acid salt, and about 5 to about 50 weight percent of a food-grade acid to form an encapsulated food-grade acid; wherein all weight percents are based on the total weight of the encapsulated food-grade acid; and melt blending a gum base, a sweetener, and the encapsulated food-grade acid to form a chewing gum composition.

In some embodiments, the poly(vinyl acetate) has a weight average molecular weight of at least 30,000 atomic mass units. In some embodiments, the poly(vinyl acetate) weight average molecular weight is about 30,000 to about 500,000 atomic mass units, more specifically about 80,000 to about 300,000 atomic mass units.

The poly(vinyl acetate) is present in an amount of about 30 to about 90 weight percent of the encapsulated food-grade acid. In some embodiments, the poly(vinyl acetate) is present in an amount of about 30 to about 80 weight percent, specifically about 35 to about 75 weight percent, more specifically about 40 to about 60 weight percent of the encapsulated food-grade acid.

Suitable fatty acid salts used to prepare the encapsulated food-grade acid include, for example, a sodium salt of a $C_{12}$-$C_{36}$ aliphatic carboxylic acid, a potassium salt of a $C_{12}$-$C_{36}$ aliphatic carboxylic acid, a calcium salt of a $C_{12}$-$C_{36}$ aliphatic carboxylic acid, a zinc salt of a $C_{12}$-$C_{36}$ aliphatic carboxylic acid, a magnesium salt of a $C_{12}$-$C_{36}$ aliphatic carboxylic acid, an aluminum salt of a $C_{12}$-$C_{36}$ aliphatic carboxylic acid, and combinations thereof. In the context of the above-mentioned fatty acid salts, suitable $C_{12}$-$C_{36}$ aliphatic carboxylic acids include saturated fatty acids such as, for example, palmitic acid, stearic acid, arachidic acid, behenic acid, lignoceric acid, lauric acid, myristic acid, and cerotic acid. Also in the context of the above-mentioned fatty acid salts, $C_{12}$-$C_{36}$ aliphatic carboxylic acids further include unsaturated fatty acids such as, for example, palmitoleic acid, sapienic acid, oleic acid, elaidic acid, vaccenic acid, linoleic acid, linoelaidic acid, alpha-linolenic acid, arachidonic acid, eicosapentaenoic acid, erucic acid, and docosahexaenoic acid. In some embodiments, the fatty acid salt is a sodium salt of a $C_{12}$-$C_{36}$ aliphatic carboxylic acid, such as sodium stearate. In other embodiments, the fatty acid salt is a calcium salt of a $C_{12}$-$C_{36}$ aliphatic carboxylic acid, such as calcium stearate. When calcium stearate is used to prepare the encapsulated food-grade acid, the calcium stearate is greater than about 80% pure, more specifically greater than about 90% pure. The fatty acid salt is present in an amount of about 5 to about 15 weight percent, based on the total weight of the encapsulated food-grade acid. In some embodiments, the fatty acid salt amount is about 7 to about 13 weight percent, specifically about 9 to about 11 weight percent.

Suitable food-grade acids used to prepare the encapsulated food-grade acid include, for example, adipic acid, ascorbic acid, aspartic acid, benzoic acid, citric acid, fumaric acid, glutamic acid, maleic acid, malic acid, oxalic acid, phosphoric acid, sorbic acid, succinic acid, tartaric acid, and mixtures thereof. In a preferred embodiment the food-grade acid includes citric acid, malic acid, or a mixture thereof. The encapsulated food-grade acid includes the food-grade acid in an amount of about 5 to about 50 weight percent, based on the total weight of the encapsulated food-grade acid. In some embodiments, the food-grade acid amount is about 10 to about 40 weight percent, specifically about 20 to about 40 weight percent, more specifically about 30 to about 40 weight percent.

In some embodiments, the encapsulated food-grade acid further comprises one or more active ingredients in addition to the food-grade acid. Such active ingredients can include, for example, flavorings, high-intensity sweeteners, oral care agents, antioxidants, nutraceuticals, pharmaceutical actives, and combinations thereof. In some embodiments, the encapsulated food-grade acid further comprises talc. In some embodiments, the talc amount is about 0.1 to about 1.0 weight percent, based on the total weight of the encapsulated food-grade acid.

In some embodiments, the food-grade acid that is used to form the encapsulated food-grade acid has a number average particle size of about 25 to about 600 micrometers. In some embodiments, the food grade acid has a number average particle size of about 50 to about 400 micrometers, more specifically about 70 to about 200 micrometers. In an embodiment the food-grade acid used to form the encapsulated food-grade acid is a solid at 25° C. and one atmosphere.

In a preferred embodiment, the encapsulated food-grade acid composition comprises the fatty acid salt in an amount of about 5 to about 15 weight percent, the food-grade acid in an amount of about 20 to about 40 weight percent, and the poly(vinyl acetate) in an amount of about 50 to about 75 weight percent.

In one embodiment of the encapsulated food-grade acid the fatty acid salt and the food-grade acid are present in a weight ratio of about 1:1 to about 1:10. In some embodiments, the fatty acid salt and the food-grade acid are present in a weight ratio of about 1:2 to about 1:8 more specifically about 1:2.5 to about 1:6. In one embodiment of the encapsulated food-grade acid the fatty acid salt and the poly(vinyl acetate) are present in a weight ratio of about 1:1.5 to about 1:20. In some embodiments, the fatty acid salt and the poly(vinyl acetate) are present in a weight ratio of about 1:2 to about 1:15 more specifically about 1:3 to about 1:13. In one embodiment of the encapsulated food-grade acid the food-grade acid and the poly(vinyl acetate) are present in a weight ratio of about 1:1 to about 1:5. In some embodiments, the food-grade acid and the poly(vinyl acetate) are present in a weight ratio of about 1:1.1 to about 1:3 more specifically about 1:1.2 to about 1:2.2.

In one preferred embodiment, the fatty acid salt is sodium stearate, the food-grade acid is citric acid, malic acid, or a combination thereof, the food-grade acid has a number average particle size of about 50 to about 100 micrometers, the encapsulated food-grade acid comprises the fatty acid salt and the food-grade acid in a weight ratio of about 1:2 to about 1:8, the encapsulated food-grade acid comprises the fatty acid salt and the poly(vinyl acetate) in a weight ratio of about 1:2.5 to about 1:15, the encapsulated food-grade acid comprises the food-grade acid and the poly(vinyl acetate) in a weight ratio of about 1:1.2 to about 1:3, the encapsulated food grade acid particles have a number average particle size less than or equal to 420 micrometers, the chewing gum composition comprises the encapsulated food-grade acid and the gum base in a weight ratio of about 1:12 to about 1:3; and the chewing gum further comprises a free food-grade acid.

Chewing Gum

As used herein, the terms "gum," "chewing gum," and "bubble gum" are used interchangeably and are meant to include any gum composition. With regard to chewing gum compositions, such compositions contain a gum base, the flavor enhancing composition, and various additives.

In one embodiment the encapsulated food-grade acid is incorporated into a chewing gum. The chewing gum includes a gum base and a sweetener in addition to the encapsulated food-grade acid. The amount of the encapsulated food-grade acid can be about 0.5 to about 12 weight percent, specifically about 1 to about 10 weight percent, more specifically about 2 to about 9 weight percent, even more specifically about 4 to about 8 weight percent, based on the weight of the chewing gum composition. In some embodiments, the encapsulated food-grade acid is present in a chewing gum composition in a particulate form having a number average particle size less than or equal to about 500 micrometers. In some embodiments, the encapsulated food-grade acid is present in a chewing gum composition in a particulate form having a number average particle size of about 5 to about 500 micrometers, specifically about 10 to about 450 micrometers, more specifically about 20 to about 420 micrometers.

In some embodiments, the gum composition includes one or more unencapsulated active ingredients in addition to the encapsulated food-grade acid. The additional active ingredients can be unencapsulated active ingredients, encapsulated active ingredients or mixtures thereof. In some embodiments, the active ingredients can include sweeteners, flavorings, high-intensity sweeteners, food-grade acids, oral care agents, antioxidants, nutraceuticals, pharmaceutical actives and mixtures thereof. In a preferred embodiment the chewing gum can further include unencapsulated food-grade acids. Suitable unencapsulated acids include any of the food-grade acids recited herein. In some embodiment, the unencapsulated acids include citric acid, malic acid, and mixtures thereof. In one embodiment, the unencapsulated active ingredients are present in an amount about 0.1 to about 2.0 weight percent based upon the total weight of the chewing gum composition. In some embodiments, the unencapsulated active ingredients are present in an amount of about 0.25 to about 1.5 weight percent, more specifically about 0.5 to about 1.0 weight percent of the chewing gum composition.

The gum compositions of the disclosed herein can be coated or uncoated, and be in the form of slabs, sticks, pellets, balls, and the like. The composition of the different forms of the gum compositions will be similar but can vary with regard to the ratio of the ingredients. For example, coated gum compositions can contain a lower percentage of softeners. Pellets and balls can have a chewing gum core, which has been coated with either a sugar solution or a sugarless solution to create the hard shell. Slabs and sticks are usually formulated to be softer in texture than the chewing gum core. In some cases, a hydroxy fatty acid salt or other surfactant actives can have a softening effect on the gum base. In order to adjust for any potential undesirable softening effect that the surfactant actives can have on the gum base, it can be beneficial to formulate a slab or stick gum having a firmer texture than usual (i.e., use less conventional softener than is typically employed).

Center-filled gum is another common gum form. The gum portion has a similar composition and mode of manufacture to that described above. However, the center-fill is typically an aqueous liquid or gel, which is injected into the center of the gum during processing. The encapsulated food-grade acid can, optionally, be incorporated into the center-fill during manufacture of the fill, incorporated directly into the chewing gum portion of the total gum composition, or incorporated into both the center-fill and the chewing gum portion. The center-filled gum can also be optionally coated and can be prepared in various forms, such as in the form of a lollipop.

The chewing gum composition generally comprises a gum base, bulk sweeteners, high intensity sweeteners, flavorants, coloring agents, sensates, and any other optional additives, including throat-soothing agents, spices, tooth-whitening agents, breath-freshening agents, vitamins, minerals, caffeine, drugs (e.g., medications, herbs, and nutritional supplements), oral care products, and combinations comprising at least one of the foregoing.

Generally, the chewing gum composition comprises a water insoluble gum base portion and a water soluble bulk portion. The gum base can vary greatly depending upon various factors such as the type of base desired, the consistency of gum desired, and the other components used in the composition to make the final chewing gum product. The gum base can be any water-insoluble gum base known in the art, and includes those gum bases utilized for chewing gums and bubble gums. Illustrative examples of suitable polymers in gum bases include both natural and synthetic elastomers and rubbers. For example, natural elastomers and rubbers include substances of vegetable origin such as smoked or liquid latex and guayule, natural gums such as jelutong, lechi caspi, perillo, sorva, massaranduba balata, massaranduba chocolate, nispero, rosidinha, crown gum, chicle, gutta percha, gutta kataiu, gutta kay, niger gutta, tunu, chilte, chiquibul, gutta hang kang, or the like, and mixtures thereof.

Synthetic elastomers include high- and low-molecular weight elastomers. Useful high molecular weight elastomers include butadiene-styrene copolymers, polyisoprene, polyisobutylene, isobutylene-isoprene copolymers, polyethylene, combinations thereof, and the like. Useful low-molecular weight elastomers include polybutene, polybutadiene, polyisobutylene, and combinations thereof. Suitable gum bases can also include vinyl polymeric elastomers such as poly(vinyl acetate) (PVA), polyethylene, vinyl copolymeric elastomers such as copolymers of vinyl acetate and vinyl laurate, copolymers of vinyl acetate and vinyl stearate, copolymers of ethylene and vinyl acetate, poly(vinyl alcohol) and combinations thereof. When utilized, the number average molecular weight of the vinyl polymers can range about 3,000 to about 94,000. Vinyl polymers such as poly (vinyl alcohol) and poly(vinyl acetate) (when employed in the gum base, as distinguished from the encapsulated food-grade acid) can have a number average molecular weight of about 8,000 to about 65,000. Furthermore, any combination of the aforementioned high- and low-molecular weight, natural and synthetic elastomers, and rubbers can be used as a gum base.

The amount of gum base employed will vary greatly depending upon various factors such as the type of base used, the consistency of the gum desired, and the other components used in the composition to make the final chewing gum product. In general, the gum base will be present in an amount of about 5 to about 94 weight percent of the final chewing gum composition. In some embodiments, the gum base amount is about 15 to about 45 weight percent, specifically about 20 to about 40 weight percent, more specifically about 30 to about 40 weight percent, based upon the total weight of the chewing gum composition.

The water-insoluble gum base portion can further additionally contain any combination of elastomer plasticizers, waxes, softeners, fillers and other optional ingredients such as colorants and antioxidants. Elastomer plasticizers are also commonly referred to as resins, resinous compounds, elastomer solvents, or rosins. Additives that can be included in the gum base include plasticizers, waxes or softeners that are used in effective amounts to provide a variety of desirable textures and consistency properties. Because of the low molecular weight of these components, the texture modifying agents are able to penetrate the fundamental structure of the gum base making it more plastic and less viscous.

The gum base composition can contain conventional elastomer plasticizers to aid in softening the elastomer base component, for example terpene resins such as polymers derived from alpha-pinene beta-pinene, and/or d-limonene; methyl, glycerol or pentaerythritol esters of rosins or modified rosins and gums, such as hydrogenated, dimerized or polymerized rosins, or combinations comprising at least one of the foregoing resins; the pentaerythritol ester of partially hydrogenated wood or gum rosin; the pentaerythritol ester of wood or gum rosin; the glycerol ester of wood rosin; the glycerol ester of partially dimerized wood or gum rosin; the glycerol ester of polymerized wood or gum rosin; the glycerol ester of tall oil rosin; the glycerol ester of wood or gum rosin; the partially hydrogenated wood or gum rosin; the partially hydrogenated methyl ester of wood or rosin; and the like. Any combination of the foregoing elastomer plasticizers can be used to soften or adjust the tackiness of the elastomer base component. The elastomer plasticizer can be used in an amount of about 5 to about 75 weight percent of the gum base, specifically about 45 to about 70 weight percent of the gum base.

Suitable softeners include lanolin, palmitic acid, oleic acid, stearic acid, fatty acids, sodium stearate, potassium stearate, glyceryl triacetate, glyceryl lecithin, glyceryl monostearate, propylene glycol monostearate, mono-, di- and triglycerides, acetylated monoglyceride, glycerin, lecithin, diacetin, and combinations thereof. Other suitable softeners include waxes. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, cocoa butter, propylene glycol, and the like can also be incorporated into the gum base to obtain a variety of desirable textures and consistency properties.

In some embodiments, the chewing gum composition further comprises a gum base softener. Softeners include, for example, lanolin, palmitic acid, oleic acid, stearic acid, fatty acids, sodium stearate, potassium stearate, glyceryl triacetate, glyceryl lecithin, glyceryl monostearate, propylene glycol monostearate, mono-, di- and triglycerides, acetylated monoglyceride, glycerin, lecithin, diacetin, waxes, and combinations thereof. In some embodiments, the softeners can be present in amounts of up to about 30 weight percent of the gum base, specifically about 0.1 to about 20 weight percent of the gum base, more specifically about 0.1 to about 4 weight percent of the gum base, still more specifically about 0.5 to about 2.5 weight percent of the gum base.

When a wax is present in the gum base, it softens the polymeric elastomer mixture and improves the elasticity of the gum base. The waxes employed will have a melting point below about 60° C., and preferably about 45 to about 55° C. The low melting wax can be a paraffin wax. The wax can be present in the gum base in an amount of about 5 to about 12 weight percent, specifically about 6 to about 10 weight percent, based on the weight of the gum base.

In addition to the low melting point waxes, waxes having a higher melting point can be used in the gum base in amounts up to about 5 weight percent of the gum base. Such high melting waxes include beeswax, vegetable wax, rice bran wax, candelilla wax, carnauba wax, polyethylene wax, microcrystalline wax, most petroleum waxes, and the like, and mixtures thereof.

The gum base can include effective amounts of bulking agents such as mineral adjuvants, which can serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, which can serve as fillers and textural agents. These fillers or adjuvants can be used in the gum base in various amounts. Specifically the amount of filler, when used, will be present in an amount of about 15 to about 40 weight percent, specifically about 20 to about 30 weight percent, based on the weight of the gum base.

In addition to a water insoluble gum base portion, a typical chewing gum composition includes a water soluble bulk portion and one or more flavoring agents. In another embodiment, the active ingredient is present in a water soluble bulk portion of the chewing gum composition. The water soluble portion can include bulk sweeteners, high-intensity sweeteners, flavoring agents, softeners, emulsifiers, coloring agents, acidulants, fillers, antioxidants, and other conventional chewing gum additives that provide desired attributes. In some embodiments, the active ingredient has a water solubility of at least about 100 grams per liter at 25° C. and one atmosphere, specifically about 200 to about 1000 grams per liter at 25° C. and one atmosphere, and more specifically about 300 to about 800 miscible grams per liter at 25° C. and one atmosphere. For example, citric acid has a water solubility of about 730 miscible grams per liter at 25° C. and one atmosphere. And malic acid has a water solubility of about 588 miscible grams per liter at 20° C. and one atmosphere. These and other conventional chewing gum additives known to one having ordinary skill in the art can also be incorporated into the gum base.

As mentioned above, a wide variety of one or more conventional additives can be used in the chewing gum composition, including sweeteners, high intensity sweeteners, flavor modulators or potentiators, flavorants/flavorings, coloring agents, medicaments, oral care agents, throat care agents, breath fresheners, mineral adjuvants, bulking agents, acidulants, buffering agents, sensates (e.g., warming agents, cooling agents, tingling agents, effervescing agents), thickeners, mouth moisteners, flavor enhancing compositions, antioxidants (e.g., butylated hydroxytoluene (BHT), butylated hydroxyanisole (BHA), or propyl gallate), preservatives, emulsifiers, thickening agents, and the like. Some of these additives can serve more than one purpose. For example, a sweetener such as sucrose, sorbitol or other sugar alcohol, or combinations of the foregoing and below-mentioned sweeteners, can also function as a bulking agent. In addition, combinations comprising at least one of the foregoing additives are often used.

In some embodiments, the chewing gum includes a sweetening agent to provide a sweet taste to the gum composition. Sweetening agents can include sugar sweeteners, sugarless sweeteners, high intensity sweeteners, or a combination of at least one of the foregoing sweetening agents.

Sugar sweeteners generally include saccharides. Suitable sugar sweeteners include monosaccharides, disaccharides and polysaccharides such as sucrose (sugar), dextrose, maltose, dextrin, xylose, ribose, glucose, mannose, galactose, fructose (levulose), lactose, invert sugar, fructooligosaccharide syrups, partially hydrolyzed starch, corn syrup solids, such as high fructose corn syrup, and mixtures thereof.

Suitable sugarless sweetening agents include sugar alcohols (or polyols) such as sorbitol, xylitol, mannitol, galactitol, maltitol, hydrogenated isomaltulose (isomalt), lactitol, erythritol, hydrogenated starch hydrolysate, stevia and mixtures thereof.

Suitable hydrogenated starch hydrolysates include those disclosed in U.S. Pat. No. 4,279,931 to Verwaerde et al. and various hydrogenated glucose syrups and/or powders, which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Also useful are mixtures of hydrogenated starch hydrolysates, such as those sold under the trade name LYCASIN by Roquette Freres of France, and those sold under the trade name HYSTAR by Lonza, Inc., of Fairlawn, N.J., USA.

A "high intensity sweetener" as used herein means agents having a sweetness at least 100 times that of sugar (sucrose) on a per weight basis, specifically at least 500 times that of sugar on a per weight basis. In one embodiment the high intensity sweetener is at least 1,000 times that of sugar on a per weight basis, more specifically at least 5,000 times that of sugar on a per weight basis. The high intensity sweetener can be selected from a wide range of materials, including water-soluble sweeteners, water-soluble artificial sweeteners, water-soluble sweeteners derived from naturally occurring water-soluble sweeteners, dipeptide based sweeteners, and protein based sweeteners. Any combination comprising one or more high intensity sweetener can be used. One or more of the high intensity sweeteners can further be combined with one or more of the foregoing sweeteners or sweetening agents.

Without being limited to particular sweeteners, representative categories and examples include: water-soluble sweetening agents such as dihydrochalcones, monellin, steviosides, Rebaudioside A, Rebaudioside B, Rebaudioside C, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834 to Zanno et al., and combinations thereof; water-soluble artificial sweeteners such as saccharin, soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and combinations thereof; dipeptide based sweeteners, for example the L-aspartic acid derived sweeteners such as L-aspartyl-L-phenylalanine methyl ester (Aspartame) and materials described in U.S. Pat. No. 3,492,131 to Schlatter, L-alpha-aspartyl-N-(2,2,4,4-tetramethyl-3-thietanyl)-D-alaninamide hydrate (Alitame), methyl esters of L-aspartyl-L-phenylglycine and L-aspartyl-L-2,5-dihydrophenylglycine, L-alpha-aspartyl-L-phenylglycine methyl ester, L-alpha-aspartyl-L-2,5-dihydrophenylglycine methyl ester, L-aspartyl-2,5-dihydro-L-phenylalanine; L-alpha-aspartyl-2,5-dihydrophenylalanine methyl ester, L-aspartyl-L-(1-cyclohexen)-alanine, N—(N-(3,3-dimethylbutyl)-L-alpha-aspartyl)-L-phenylalanine methyl ester (Neotame), or a combination thereof; water-soluble sweeteners derived from naturally occurring water-soluble sweeteners, such as steviosides, Rebaudioside A, Rebaudioside B, Rebaudioside C, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructofuranoside, 4,1'-dichloro-4,1'-dideoxygalactosucrose; 1',6'-dichloro-1',6'-dideoxysucrose; 1,6-dichloro-1,6-dideoxy-β-D-fructofuranosyl-4-chloro-4-deoxy-α-D-galactopyranoside; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; 4,6,1',6'-tetradeoxy-sucrose, and combinations thereof; protein based sweeteners such as thaumatococcous danielli, thaumatin, talin; mogrosides (lo han guo); and combinations thereof; and amino acid based sweeteners. In a preferred embodiment, the sweeteners include sorbitol, mannitol, monatin, aspartame, acesulfame potassium salt, and mixtures thereof.

The high intensity sweetener can be used in a variety of distinct physical forms, for example those known in the art to provide an initial burst of sweetness and/or a prolonged sensation of sweetness. Without being limited thereto, such physical forms include free forms (e.g., spray dried or powdered), beaded forms, encapsulated forms, and combinations thereof.

In a chewing gum, a sweet taste can come from flavor modulators or potentiators and/or from flavorants as well as from sweeteners. Flavor potentiators can consist of materials that intensify, supplement, modify or enhance the taste or aroma perception of an original material without introducing a characteristic taste or aroma perception of their own. Flavor modulators can impart a characteristic of their own that complements or negates a characteristic of another component. In some embodiments, flavor modulators or potentiators are designed to intensify, supplement, modify, or enhance the perception of flavor, sweetness, tartness, umami, kokumi, saltiness and combinations thereof can be included. Thus, the addition of flavor modulators or potentiators can impact the overall taste of the comestible. For example, flavors can be compounded to have additional sweet notes by the inclusion of flavor modulators or potentiators, such as vanilla, vanillin, ethyl maltol, furfual, ethyl propionate, lactones, and combinations thereof.

Exemplary flavor modulators or potentiators include monoammonium glycyrrhizinate, licorice glycyrrhizinates, citrus aurantium, alapyridaine, alapyridaine (N-(1-carboxyethyl)-6-(hydroxymethyl)pyridinium-3-ol) inner salt, miraculin, curculin, strogin, mabinlin, gymnemic acid, cynarin, glupyridaine, pyridinium-betain compounds, neotame, thaumatin, neohesperidin dihydrochalcone, tagatose, trehalose, maltol, ethyl maltol, vanilla extract, vanilla oleoresin, vanillin, sugar beet extract (alcoholic extract), sugarcane leaf essence (alcoholic extract), compounds that respond to G-protein coupled receptors (T2Rs and T1Rs), and combinations thereof. In some embodiments, the flavor modulator or potentiator is selected from sugar acids, sodium chloride, potassium chloride, sodium acid sulfate, and combinations thereof. In other embodiments, the flavor modulator or potentiator is selected from glutamates such as monosodium glutamate, monopotassium glutamate, hydrolyzed vegetable protein, hydrolyzed animal protein, yeast extract, and combinations thereof. Further examples include adenosine monophosphate (AMP), glutathione, and nucleotides such as inosine monophosphate, disodium inosinate, xanthosine monophosphate, guanylate monophosphate, and combinations thereof. Further examples of flavor potentiator compositions that impart kokumi are also included in U.S. Pat. No. 5,679,397 to Kuroda et al.

The amount of flavor modulators, flavor potentiators, and flavorants used herein can be a matter of preference subject to such factors as the type of final comestible product composition, the individual flavor, the confectionary base employed, and the strength of flavor desired. Thus, the amount of flavoring can be varied in order to obtain the result desired in the final product and such variations are within the capabilities of those skilled in the art without the need for undue experimentation.

In some embodiments, the chewing gum can contain aroma agents and/or flavoring agents including natural and synthetic flavorings such as natural vegetable components, flavoring aromatics and/or oils, essential oils, essences, extracts, powders, food-grade acids, oleoresins and extracts derived from plants, leaves, flowers, fruits, and the like, and combinations thereof. The flavorings can be in liquid or powdered form.

Examples of artificial, natural and synthetic fruit flavorings include coconut, coffee, chocolate, vanilla, lemon, grapefruit, orange, lime, yazu, sudachi, menthol, licorice, caramel, honey, peanut, walnut, cashew, hazelnut, almonds, pineapple, strawberry, raspberry, blackberry, tropical fruits, cherries, cinnamon, peppermint, wintergreen, spearmint, eucalyptus, and mint, fruit essence such as from apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya, and the like.

Other potential flavors whose release profiles can be managed include a milk flavor, a butter flavor, a cheese flavor, a cream flavor, a yogurt flavor, a vanilla flavor, a tea or coffee flavor, such as a green tea flavor, a oolong tea flavor, a cocoa flavor, a chocolate flavor, a mint flavor, such as peppermint, spearmint, and Japanese mint; spicy flavors, such as asafetida, ajowan, anise, angelica, fennel, allspice, cinnamon, chamomile, mustard, cardamom, caraway, cumin, clove, pepper, coriander, sassafras, savory, Zanthoxyli Fructus, perilla, juniper berry, ginger, star anise, horseradish, thyme, a tarragon, dill, capsicum, nutmeg, basil, marjoram, rosemary, bay leaf, and wasabi; alcoholic flavors, such as wine, whisky, brandy, rum, gin, and liqueur; floral and vegetable flavors, such as onion, garlic, cabbage, carrot, celery, mushroom, and tomato. Commonly used flavorings include mints such as peppermint, menthol, spearmint, artificial vanilla, cinnamon derivatives, and various fruit flavors, whether employed individually or in admixture. Flavors can also provide breath freshening properties, particularly the mint flavors when used in combination with cooling agents. In some embodiments, the composition can further include fruit juices.

The flavoring agents can be used in many distinct physical forms. Such physical forms include liquid and/or dried form. In some embodiments, the flavoring agents can be in free (unencapsulated) forms, spray dried forms, freeze dried forms, powdered forms, beaded forms, encapsulated forms, slices, pieces, and mixtures thereof. When employed in a spray-dried form, suitable drying means such as spray drying a liquid can be used. Alternatively, the flavoring agent can be absorbed onto water soluble materials, such as cellulose, starch, sugar, maltodextrin, gum arabic and so forth or it can be encapsulated. In still other embodiments, the flavoring agent can be adsorbed onto silicas, zeolites, and the like. The particle size of the flavorings can be less than 3 millimeters, less than 2 millimeters or preferably less than 1 millimeter, calculated as the longest dimension of the particle. The natural flavoring agent can have a particle size of about 3 micrometers to about 2 millimeters, specifically about 4 micrometers to about 1 millimeter.

Various synthetic flavors, such as mixed fruit flavors can also be used in the chewing gum. The aroma agent can be used in quantities smaller than those conventionally used. The aroma agents and/or flavors can be used in the amount of about 0.01 to about 30 weight percent of the gum composition depending on the desired intensity of the aromas and/or flavors used. Preferably, the content of the aromas and/or flavors is in the range of about 0.2 to about 4 weight percent of the gum composition.

In some embodiments, the encapsulated food-grade acid further contains a flavoring, any of the flavoring described herein are suitable for use. The flavoring can include a powder flavor, a liquid flavor, a natural vegetable component, a flavoring aromatic, a flavoring oil, an essential oil, an essence, an extract, a food-grade acid, an oleoresin, a plant extract, a flower extract, a fruit extract, and combinations thereof.

The chewing gum can further include cooling and warming agents. Cooling agents, also known as coolants, are additives that provide a cooling or refreshing effect in the mouth, in the nasal cavity, or on skin. Menthyl-based coolants as used herein include menthol and menthol derivatives. Menthol (also known as 2-(2-propyl)-5-methyl-1-cyclohexanol) is available in artificial form, or naturally from sources such as peppermint oil. Menthol derivatives include menthyl ester-based and menthyl carboxamide-based cooling compounds such as menthyl carboxamide, N-ethyl-p-menthane carboxamide, monomenthyl succinate, monomenthyl methyl succinate, monomenthyl glutarate, menthyl 2-pyrrolidone-5-carboxylate, monomenthyl 3-methyl maleate, menthyl acetate, menthyl lactate, menthyl salicylate, 2-isopropanyl-5-methylcyclohexanol, 3-L-menthoxypropane-1,2-diol, menthane, menthone, menthone ketals, menthone glycerol ketals, menthyl glutarate esters, N-ethyl-p-menthane-3-carboxamide (WS-3), and combinations thereof.

Other coolants can be used in combination with the menthyl-based coolant, for example 2-mercapto-cyclo-decanone, hydroxycarboxylic acids with 2 to 6 carbon atoms, N,2,3-trimethyl-2-isopropyl butanamide, xylitol, erythritol, alpha-dimethyl succinate, methyl lactate, and combinations thereof.

Warming agents can be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol iso-propylether, vanillyl alcohol isobutylether, vanillyl alcohol n-aminoether, vanillyl alcohol isoamylether, vanillyl alcohol n-hexylether, vanillyl alcohol methylether, vanillyl alcohol ethylether, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerin, and combinations thereof.

Coloring agents (colorants, colorings) can be used in amounts effective to produce a desired color for the comestible. Suitable coloring agents include pigments, which can be incorporated in amounts up to about 6 weight percent of the chewing gum composition. For example, titanium dioxide can be incorporated in amounts up to about 2 weight percent, and specifically less than about 1 weight percent by weight of the chewing gum composition.

Suitable coloring agents also include natural food colors and dyes suitable for food, drug, and cosmetic applications. Suitable colors include annatto extract (E160b), bixin, norbixin, astaxanthin, dehydrated beets (beet powder), beetroot red/betanin (E162), ultramarine blue, canthaxanthin (E161g), cryptoxanthin (E161c), rubixanthin (E161d), violanxanthin (E161e), rhodoxanthin (E161f), caramel (E150 (a-d)), β-apo-8'-carotenal (E160e), β-carotene (E160a), alpha carotene, gamma carotene, ethyl ester of beta-apo-8 carotenal (E160f), flavoxanthin (E161a), lutein (E161b), cochineal extract (E120), carmine (E132), carmoisine/azorubine (E122), sodium copper chlorophyllin (E141), chlorophyll (E140), toasted partially defatted cooked cottonseed flour, ferrous gluconate, ferrous lactate, grape color extract, grape skin extract (enocianina), anthocyanins (E163), haematococcus algae meal, synthetic iron oxide, iron oxides and hydroxides (E172), fruit juice, vegetable juice, dried algae meal, tagetes (Aztec marigold) meal and extract, carrot oil, corn endosperm oil, paprika, paprika oleoresin, phaffia yeast, riboflavin (E101), saffron, titanium dioxide, turmeric (E100), turmeric oleoresin, amaranth (E123), capsanthin/capsorbin (E160c), lycopene (E160d), FD&C blue #1, FD&C blue #2, FD&C green #3, FD&C red #3, FD&C red #40, FD&C yellow #5 and FD&C yellow #6, tartrazine (E102), quinoline yellow (E104), sunset yellow (E110), ponceau (E124), erythrosine (E127), patent blue V (E131), titanium dioxide (E171), aluminum (E173), silver (E174), gold (E175), pigment rubine/lithol rubine BK (E180), calcium carbonate (E170), carbon black (E153), black PN/brilliant black BN (E151), green S/acid brilliant green BS (E142), FD&C aluminum lakes, and combinations thereof.

Exemplary breath fresheners that can be used in the chewing gum include zinc citrate, zinc acetate, zinc fluoride, zinc ammonium sulfate, zinc bromide, zinc iodide, zinc chloride, zinc nitrate, zinc fluorosilicate, zinc gluconate, zinc tartrate, zinc succinate, zinc formate, zinc chromate, zinc phenol sulfonate, zinc dithionate, zinc sulfate, silver nitrate, zinc salicylate, zinc glycerophosphate, copper nitrate, chlorophyll, copper chlorophyll, chlorophyllin, hydrogenated cottonseed oil, chlorine dioxide, beta cyclodextrin, zeolite, silica-based material, carbon-based material, enzymes such as laccase, or a mixture comprising at least one of the foregoing. Breath fresheners can include essential oils as well as various aldehydes and alcohols. Essential oils used as breath fresheners can include oils of spearmint, peppermint, wintergreen, sassafras, chlorophyll, citral, geraniol, cardamom, clove, sage, carvacrol, eucalyptus, cardamom, magnolia bark extract, marjoram, cinnamon, lemon, lime, grapefruit, orange, or a combination thereof. Aldehydes such as cinnamic aldehyde and salicylaldehyde can be used. Additionally, chemicals such as menthol, carvone, iso-garrigol, and anethole can function as breath fresheners.

Exemplary mouth moisteners include saliva stimulators such as acids and salts including acetic acid, adipic acid, ascorbic acid, butyric acid, citric acid, formic acid, fumaric acid, glyconic acid, lactic acid, phosphoric acid, malic acid, oxalic acid, succinic acid, and tartaric acid. Mouth moisteners can include hydrocolloid materials that hydrate and can adhere to oral surface to provide a sensation of mouth moistening. Hydrocolloid materials can include naturally occurring materials such as plant exudates, seed gums, and seaweed extracts or they can be chemically modified materials such as cellulose, starch, or natural gum derivatives. Furthermore, hydrocolloid materials can include pectin, gum arabic, acacia gum, alginates, agar, carrageenans, guar gum, xanthan gum, locust bean gum, gelatin, gellan gum, galactomannans, tragacanth gum, karaya gum, curdlan, konjac, chitosan, xyloglucan, beta glucan, furcellaran, gum ghatti, tamarin, and bacterial gums. Mouth moisteners can include modified natural gums such as propylene glycol alginate, carboxymethyl locust bean gum, low methoxyl pectin, or a combination thereof. Modified celluloses can be included, such as microcrystalline cellulose, carboxymethylcellulose (CMC), methylcellulose (MC), hydroxypropylmethylcellulose (HPMC), hydroxypropylcellulose (HPC), or a combination thereof.

Similarly, humectants, which can provide a perception of mouth hydration, can be included. Such humectants can include glycerol, sorbitol, polyethylene glycol, erythritol, xylitol, or a combination thereof. Additionally, in some embodiments, fats can provide a perception of mouth moistening. Such fats can include medium chain triglycerides, vegetable oils, fish oils, mineral oils, or a combination thereof.

Exemplary buffering agents include sodium bicarbonate, sodium phosphate, sodium hydroxide, ammonium hydroxide, potassium hydroxide, sodium stannate, triethanolamine, citric acid, hydrochloric acid, sodium citrate, or a combination thereof.

The relative amounts of each of the components of the chewing gum composition will depend on the identity of the component, as well as the desired flavor, and are readily determined by one of ordinary skill in the art.

In some embodiments, a tingling sensation can be provided. Tingling agents include jambu, and alkylamides extracted from materials such as jambu or sanshool.

Additionally, a sensation can be created due to effervescence. Such effervescence is created by combining a basic material with an acidic material. In some embodiments, the basic material can include alkali metal carbonates, alkali metal bicarbonates, alkaline earth metal carbonates, alkaline earth metal bicarbonates, and combinations thereof. In some embodiments, the acidic material can include acetic acid, adipic acid, ascorbic acid, butyric acid, citric acid, formic acid, fumaric acid, glyconic acid, lactic acid, phosphoric acid, malic acid, oxalic acid, succinic acid, tartaric acid, and combinations thereof.

Suitable oral care agents include breath fresheners, tooth whiteners, antimicrobial agents, tooth mineralizers, tooth decay inhibitors, topical anesthetics, mucoprotectants, stain removers, oral cleaning agents, bleaching agents, desensitizing agents, dental remineralization agents, antibacterial agents, anticaries agents, plaque acid buffering agents, surfactants and anticalculus agents, and combinations thereof. Examples of such ingredients include hydrolytic agents including proteolytic enzymes, abrasives such as hydrated silica, calcium carbonate, sodium bicarbonate and alumina, other active stain-removing components such as surface-active agents, including anionic surfactants such as sodium stearate, sodium palminate, sulfated butyl oleate, sodium oleate, salts of fumaric acid, glycerol, hydroxylated lecithin, sodium lauryl sulfate and chelators such as polyphosphates, which are typically employed as tartar control ingredients. Oral care ingredients can also include tetrasodium pyrophosphate, sodium bicarbonate, sodium acid pyrophosphate, sodium tripolyphosphate, xylitol, sodium hexametaphosphate, and mixtures thereof.

In addition, suitable oral care agents include peroxides such as carbamide peroxide, calcium peroxide, magnesium peroxide, sodium peroxide, hydrogen peroxide, and peroxydiphosphate. In some embodiments, potassium nitrate and potassium citrate are included. Other examples can include casein glycomacropeptide, calcium casein peptone-calcium phosphate, casein phosphopeptides, casein phosphopeptide-amorphous calcium phosphate (CPP-ACP), and amorphous calcium phosphate. Still other examples can include papaine, krillase, pepsin, trypsin, lysozyme, dextranase, mutanase, glycoamylase, amylase, glucose oxidase, and combinations thereof.

Suitable oral care agents include surfactants that achieve increased prophylactic action and render the oral care ingredients more cosmetically acceptable. Surfactants used as oral care agents include detersive materials that impart to the composition detersive and foaming properties. Suitable surfactants include sodium stearate, sodium ricinoleate, sodium lauryl sulfate, water-soluble salts of higher fatty acid monoglyceride monosulfates, such as the sodium salt of the monosulfated monoglyceride of hydgrogenated coconut oil fatty acids, higher alkyl sulfates such as sodium lauryl sulfate, alkyl aryl sulfonates such as sodium dodecyl benzene sulfonate, higher alkyl sulfoacetates, sodium lauryl sulfoacetate, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolammonium salts of N-lauroyl sarcosine, N-myristoyl sarcosine, or N-palmitoyl sarcosine.

In addition to surfactants, oral care ingredients can include antibacterial agents such as triclosan, chlorhexidine, zinc citrate, silver nitrate, copper, limonene, cetyl pyridinium chloride, and combinations thereof.

Anticaries agents include fluoride ion sources, such as sodium fluoride, potassium fluoride, sodium fluorosilicate, ammonium fluorosilicate, potassium fluoride, sodium monofluorophosphate, stannous fluoride, potassium stannous fluoride, sodium hexafluorostannate, stannous chlorofluoride, and combinations thereof.

Further examples are included in U.S. Pat. No. 5,227,154 to Reynolds, U.S. Pat. No. 5,378,131 to Greenberg, and U.S. Pat. No. 6,685,916 to Holme et al.

Throat care or throat-soothing ingredients include analgesics, antihistamines, anesthetics, demulcents, mucolytics, expectorants, antitussives, antiseptics, and combinations thereof. In some embodiments, a throat soothing agent such as honey, propolis, aloe vera, glycerin, menthol, or a combination thereof is employed.

Additional bulking agents (carriers, extenders) suitable for use include sweetening agents such as monosaccharides, disaccharides, polysaccharides, sugar alcohols, polydextrose, maltodextrins, and combinations thereof; and minerals, such as calcium carbonate, talc, titanium dioxide, dicalcium phosphate, and combinations thereof. Bulking agents can be used in amounts up to about 90 weight percent of the chewing gum composition, specifically about 40 to about 70 weight percent of the chewing gum composition, more specifically about 50 to about 65 weight percent of the chewing gum composition.

Suitable emulsifiers include distilled monoglycerides, acetic acid esters of mono and diglycerides, citric acid esters of mono and diglycerides, lactic acid esters of mono and diglycerides, mono and diglycerides, polyglycerol esters of fatty acids, ceteareth-20, polyglycerol polyricinoleate, propylene glycol esters of fatty acids, polyglyceryl laurate, glyceryl cocoate, gum arabic, acacia gum, sorbitan monostearates, sorbitan tristearates, sorbitan monolaurate, sorbitan monooleate, sodium stearoyl lactylates, calcium stearoyl lactylates, diacetyl tartaric acid esters of mono- and diglycerides, glyceryl tricaprylate-caprate/medium chain triglycerides, glyceryl dioleate, glyceryl oleate, glyceryl lacto esters of fatty acids, glyceryl lacto palmitate, glyceryl stearate, glyceryl laurate, glyceryl dilaurate, glyceryl monoricinoleate, triglyceryl monostearate, hexaglyceryl distearate, decaglyceryl monostearate, decaglyceryl dipalmitate, decaglyceryl monooleate, polyglyceryl 10 hexaoleate, medium chain triglycerides, caprylic/capric triglyceride, propylene glycol monostearate, polysorbate 20, polysorbate 40, polysorbate 60, polysorbate 80, polysorbate 65, hexylglyceryl distearate, triglyceryl monostearate, the poly(oxyethylene) sorbitan fatty acid esters sold under the trade name TWEEN, the sorbitan fatty acid esters sold under the trade name SPAN, stearoyl lactylates, calcium stearoyl-2-lactylate, sodium stearoyl-2-lactylate lecithin, ammonium phosphatide, sucrose esters of fatty acids, sucroglycerides, propane-1,2-diol esters of fatty acids, and combinations comprising at least one of the foregoing.

Suitable thickening agents include cellulose ethers (e.g., hydroxyethylcellulose, hydroxypropylmethylcellulose, or hydroxypropylcellulose), methylcellulose, carboxymethylcellulose, and combinations thereof. Additional polymers useful as thickeners include the acrylic acid polymers and copolymer sold under the trade name CARBOMER; poly(vinyl pyrrolidone); poly(vinyl alcohol); sodium alginate; polyethylene glycol; natural gums like xanthan gum, tragacantha, guar gum, acacia gum, arabic gum; water-dispersible polyacrylates like poly(acrylic acid); methyl methacrylate copolymers; carboxyvinyl copolymers; and combinations thereof.

In some embodiments, the chewing gum can also deliver multiple, distinct flavors to the consumer resulting in a flavor-changing gum composition. In one embodiment, the chewing gum composition contains a poly(vinyl acetate) and fatty acid salt encapsulated food-grade acid, as described herein, and further contains at least a first flavor composition and a second flavor composition, wherein the first flavor composition begins to release from the chewing gum when the chewing gum composition is masticated, and the second flavor composition comprising the encapsulated food-grade acid begins to release after the first flavor composition has begun to release. In another embodiment, the chewing gum includes a third flavor composition that begins to release after the second flavor composition.

In other embodiments, the chewing gum composition delivers multiple, distinct flavors such as, for example, sweet flavors, sour flavors, fruit flavors, mint flavors and the like, including any of the flavorings and/or sensates disclosed herein. The sweet and sour flavors can be released in any sequential order or combination. For example, in one embodiment of the gum composition the first flavor composition is a sweet flavor and the second flavor composition is a sour flavor. In another embodiment, the first flavor composition is a sweet flavor, the second flavor composition is a sour flavor, and the third flavor composition is a sweet flavor.

In some embodiments, the first flavor composition releases for about 5 minutes to about 7 minutes after mastication begins and the second flavor composition releases for about 8 minutes to about 10 minutes after mastication begins. In other embodiments, the first flavor composition releases for about 5 minutes to about 7 minutes after mastication begins, the second flavor composition releases for about 8 minutes to about 10 minutes after mastication begins, and the third flavor composition releases for about for about 10 minutes to about 30 minutes after mastication begins. In additional embodiments, the first flavor composition releases for about 6 minutes to about 7 minutes after mastication begins, the second flavor composition releases for about 7 minutes to about 12 minutes after mastication begins, and the third flavor composition releases for about for about 12 minutes to about 30 minutes after mastication begins.

This disclosure further comprises methods of preparing an encapsulated food-grade acid and a chewing gum containing the same. Some embodiments include a method for preparing the gum compositions, including both chewing gum and bubble gum compositions. These chewing gum compositions can be prepared using any standard techniques and equipment known to those skilled in the art. The apparatus useful in accordance with some embodiments includes mixing and heating apparatus that are well known in the chewing gum manufacturing arts, and therefore the selection of the specific apparatus will be apparent to the artisan.

In one embodiment, a method of preparing an encapsulated food-grade acid comprises melt blending a poly(vinyl acetate), a fatty acid salt and a food-grade acid to form the encapsulated food-grade acid. In some embodiments the food-grade acid used to form the encapsulated food-grade acid is a solid at 25° C. and one atmosphere and has a particle size as previously described herein. In some embodiments, melt blending the poly(vinyl acetate), the fatty acid salt, and the food-grade acid is conducted at a temperature of about 80 to about 120° C., more specifically at a temperature of about 90 to about 110° C. In a preferred embodiment, melt blending the poly(vinyl acetate), the fatty acid salt, and the food-grade acid includes the steps of melt blending the fatty acid salt with the melted poly(vinyl acetate), and then melt blending the food-grade acid with the melt-blended poly(vinyl acetate) and fatty acid salt to form the encapsulated food-grade acid.

Once the encapsulated food-grade acid is formed it can be cooled and ground to form particles having a number average particle size less than or equal to 800 micrometers, specifically less than or equal to about 600 micrometers, more specifically less than or equal to about 420 micrometers. In other embodiments, the encapsulated food-grade acid can be processed into particles by grinding, sieving, screening, cutting, crushing, compressing, milling, or the like. Once the encapsulated food-grade acid is processed to the desired particle size, it can be stored in a cool dry place, such as in an airtight container at low humidity and a temperature less than about 35° C.

The encapsulated food-grade acid can be further incorporated into a chewing gum composition by melt blending a gum base, a sweetener, and the encapsulated food-grade acid to form the chewing gum composition. A preferred embodiment includes melt blending the a gum base, a sweetener, and the encapsulated food-grade acid includes the steps of melt blending the sweetener and the encapsulated food-grade acid with the melted gum base to form the chewing gum composition. In another preferred embodiment melt blending the gum base, the sweetener, and the encapsulated food-grade acid further includes melt blending the gum base, the sweetener, and the encapsulated food-grade acid with an unencapsulated food-grade acid.

In addition, melt blending the poly(vinyl acetate), the fatty acid salt, and the food-grade acid includes melt blending with a mixing energy of about 70 to about 350 kilojoules per kilogram of encapsulated food-grade acid. In some embodiments, the mixing energy is about 100 to about 300 kilojoules per kilogram, specifically about 150 to about 250 kilojoules per kilogram. Mixing energy for melt blending is calculated by dividing the energy consumed to drive the melt mixing elements (e.g., the screws of a twin-screw extruder) by the mass of melt processed. For example, if 100 kilojoules of energy are required to drive the screws of a twin-screw extruder during the melt blending of 1 kilogram of encapsulated food-grade acid, then the mixing energy is 100 kilojoules/1 kilogram=100 kilojoules/kilogram.

In one exemplary process, a gum base is heated to a temperature sufficiently high to soften the base without adversely effecting the physical and chemical make up of the base, which will vary depending upon the composition of the gum base used, and is readily determined by those skilled in the art without undue experimentation. For example, the gum base can be melted to about 60° C. to about 160° C., or melted to about 150° C. to about 175° C., for a period of time sufficient to render the base molten, e.g., about thirty minutes, just prior to being admixed incrementally with the remaining ingredients of the base such as the plasticizer, fillers, the bulking agent or sweeteners, the softener and coloring agents to plasticize the blend as well as to modulate the hardness, viscoelasticity and formability of the base, and the flavor enhancing composition (as a concentrate with other additives or separately). Mixing is continued until a uniform mixture of the gum composition is obtained. The resulting chewing gum composition is allowed to cool. Thereafter the gum composition mixture can be sized and formed into desirable gum shapes, i.e., stick, slab, pellet, ball, or the like. The sized chewing gum can be conditioned for about one day to about one week prior to packaging the chewing gum.

In one preferred embodiment, the method of preparing a chewing gum composition includes melt blending a poly(vinyl acetate), a fatty acid salt and a food-grade acid to form an encapsulated food-grade acid. Then melt blending a gum base, a sweetener, and the encapsulated food-grade acid to form a chewing gum composition, wherein the encapsulated food-grade acid comprises the fatty acid salt in an amount of about 5 to about 20 weight percent, the food-grade acid in an amount of about 5 to about 50 weight percent, and the poly(vinyl acetate) in an amount of about 30 to about 90 weight percent, based on the total weight of the encapsulated food-grade acid composition. In some embodiments, the fatty acid salt comprises sodium stearate; the food-grade acid comprises citric acid, malic acid, or a combination thereof; the food-grade acid has a number average particle size of about 50 to about 100 micrometers prior to said melt blending the poly(vinyl acetate), the fatty acid salt, and the food-grade acid; the encapsulated food-grade acid comprises the fatty acid salt and the food-grade acid in a weight ratio of about 1:2 to about 1:8; the encapsulated food-grade acid comprises the fatty acid salt and the poly(vinyl acetate) in a weight ratio of about 1:2.5 to about 1:15; the encapsulated food-grade acid comprises the food-grade acid and the poly(vinyl acetate) in a weight ratio of about 1:1.2 to about 1:3, and the total chewing gum composition comprises the encapsulated food-grade acid and the gum base in a weight ratio of about 1:12 to about 1:3. In some embodiments, the method further includes melt blending the poly(vinyl acetate), the fatty acid salt, and the food-grade acid at a temperature of about 90 to about 120° C., grinding the encapsulated food grade acid to form particles having a number average particle size less than or equal to 420 micrometers, and melt blending the gum base, the sweetener, and the encapsulated food-grade acid with an unencapsulated food-grade acid.

In some embodiments, gum pieces can be coated with an aqueous coating composition, which can be applied by any method known in the art. The coating composition can be present in an amount of about 25 to about 35 weight percent of the total gum piece.

The outer coating can be hard or crunchy. In some embodiments, the outer coating includes sorbitol, maltitol, xylitol, isomalt, or another crystallizable polyol; sucrose can also be used. Flavorants can also be added to yield unique product characteristics.

The coating, if present, can include several opaque layers, such that the chewing gum composition is not visible through the coating itself, which can optionally be covered with a further one or more transparent layers for aesthetic, textural and protective purposes. The outer coating can also contain small amounts of water and gum arabic. The coating can be further coated with wax. The coating can be applied in a conventional manner by successive applications of a coating solution, with drying in between each coat. As the coating dries it usually becomes opaque and is usually white, though other colorants can be added. A polyol coating can be further coated with wax. The coating can further include colored flakes or speckles.

If the composition comprises a coating, it is possible that one or more of the above-mentioned active ingredients can be dispersed throughout the coating. This may be preferred if one or more of the active ingredients is incompatible in a single phase composition with another of the actives.

The coating can be formulated to assist with increasing the thermal stability of the gum piece and preventing leaking of a liquid fill if the gum product is a center-filled gum. In some embodiments, the coating can include a gelatin composition. The gelatin composition can be added as a 40 weight percent solution and can be present in the coating composition about 5 to about 10 weight percent of the coating composition, and more specifically about 7 to about 8 weight percent of the coating solution. The gel strength of the gelatin can be about 130 bloom to about 250 bloom.

Additives, such as physiological coolants, throat-soothing agents, spices, warming agents, oral care agents, medicaments, vitamins, caffeine, and conventional additives can be included in any or all portions of the chewing gum composition. Such components can be used in amounts sufficient to achieve their intended effects.

The foregoing and other embodiments are further illustrated by the following examples, which are not intended to limit the effective scope of the claims. All parts and percentages in the examples and throughout the specification and claims are by weight of the final composition unless otherwise specified.

Examples 1-6 and Comparative Examples 1-6

These experiments illustrate the preparation of encapsulated acid compositions comprising sodium stearate and other texture modifiers. Compositions are summarized in Table 1, where component amounts are expressed in weight percent based on the total weight of the encapsulated acid composition. The poly(vinyl acetate) had a weight average molecular weight of about 80,000-100,000 and was obtained as VINNAPAS B 100 SP from Wacker Biosolutions. In Table 1, the glycerol monostearate was obtained as Aldol MS2 from Lonza Group Ltd. Hydrogenated oil was a blend of hydrogenated cottonseed oil and hydrogenated palm oil, the blend having a melting point of about 71° C., obtained as Hydrogenated Vegetable Oil from Stratas Foods. Citric acid and malic acid were obtained in powder form having a number average particle size of about 75 micrometers. Calcium stearate was obtained from Covidien-Mallinckrodt (Saint Louis, USA). The calcium stearate used in example 4 contained free fatty acids from about 0-10% and free calcium oxide from about 0-15%. The extruder was a Brabender conical twin-screw extruder having a 43.2 millimeter (feed end) to 29 millimeter (discharge end) internal diameter and a barrel length of 36 centimeters, operated at a barrel temperature of 110° C.

To prepare the encapsulated acids, the poly(vinyl acetate) was melt blended with any texture modifier, then the acid was added. The extrudate was cooled, then ground and sieved to a number average particle size less than 420 micrometers. The powdered encapsulated acid was stored in an air-tight container at low humidity and a temperature less than 35° C. prior to use to form gum compositions.

Figure 1:
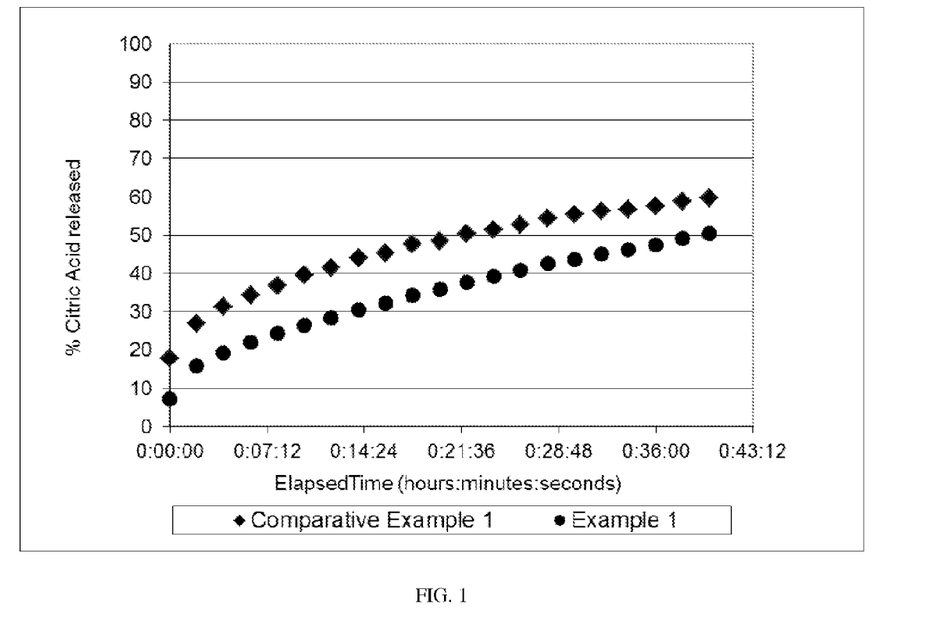
FIG. 1 is a plot of citric acid release from two encapsulated citric acid compositions.

Release of citric acid from the Example 1 and Comparative Example 1 compositions was determined using a Distek OPT-DISS™ multi-channel fiber optic UV spectrophotometer based dissolution system. The release of acid from the encapsulations was measured in a 40 minute dissolution study at an analytical wavelength of 210 nanometers. The results, presented in FIG. 1, show that the Example 1 co-encapsulation of citric acid and sodium stearate yielded a slower release of citric acid than did the Comparative Example 1 co-encapsulation of citric acid and plasticizers.

TABLE 1

|  | Ex. 1 | C. Ex. 1 | Ex. 2 | C. Ex. 2 |
|---|---|---|---|---|
| COMPOSITIONS | | | | |
| Poly (vinyl acetate) | 65.00 | 65.00 | 45.00 | 55.00 |
| Citric acid | 30.00 | 30.00 | 40.00 | 40.00 |
| Malic acid | 0.00 | 0.00 | 0.00 | 0.00 |
| Tartaric Acid | 0.00 | 0.00 | 0.00 | 0.00 |
| Fumaric Acid | 0.00 | 0.00 | 0.00 | 0.00 |
| Sodium stearate | 5.00 | 0.00 | 15.00 | 0.00 |
| Calcium stearate | 0.00 | 0.00 | 0.00 | 0.00 |
| Hydrogenated oil | 0.00 | 3.75 | 0.00 | 3.75 |
| Glycerol monostearate | 0.00 | 1.25 | 0.00 | 1.25 |

|  | Ex. 3 | C. Ex. 3 | Ex. 4 | C. Ex. 4 |
|---|---|---|---|---|
| COMPOSITIONS | | | | |
| Poly(vinyl acetate) | 45.00 | 55.00 | 50.00 | 55.00 |
| Citric acid | 0.00 | 0.00 | 40.00 | 40.00 |
| Malic acid | 40.00 | 40.00 | 0.00 | 0.00 |
| Tartaric Acid | 0.00 | 0.00 | 0.00 | 0.00 |
| Fumaric Acid | 0.00 | 0.00 | 0.00 | 0.00 |
| Sodium stearate | 15.00 | 0.00 | 0.00 | 0.00 |
| Calcium stearate | 0.00 | 0.00 | 10.00 | 0.00 |
| Hydrogenated oil | 0.00 | 3.75 | 0.00 | 0.00 |
| Glycerol monostearate | 0.00 | 1.25 | 0.00 | 5.00 |

|  | Ex. 5 | C. Ex. 5 | Ex. 6 | C. Ex. 6 |
|---|---|---|---|---|
| COMPOSITIONS | | | | |
| Poly(vinyl acetate) | 45.00 | 55.00 | 50.00 | 50.00 |
| Citric acid | 0.00 | 0.00 | 38.00 | 38.00 |
| Malic acid | 20.00 | 20.00 | 0.00 | 0.00 |
| Tartaric Acid | 2.00 | 2.00 | 0.00 | 0.00 |
| Fumaric Acid | 18.00 | 18.00 | 0.00 | 0.00 |

TABLE 1-continued

| | | | | |
|---|---|---|---|---|
| Sodium stearate | 15.00 | 0.00 | 0.00 | 0.00 |
| Calcium stearate | 0.00 | 0.00 | 12.00 | 7.00 |
| Hydrogenated oil | 0.00 | 3.75 | 0.00 | 3.25 |
| Glycerol monostearate | 0.00 | 1.25 | 0.00 | 1.25 |

Example 7 and Comparative Example 7

These examples illustrate the preparation of chewing gums using encapsulated acids. The Example 7 chewing gum composition incorporates the inventive encapsulated acids of Examples 2 and 3. The Comparative Example 7 chewing gum composition incorporates the comparative encapsulated acids of Comparative Examples 2 and 3. The chewing gum compositions are summarized in Table 2, where component amounts are expressed in weight percent based on the total weight of the chewing gum composition.

To prepare the compositions, the gum base is melted in a mixer at 90° C. The encapsulated acids, free (unencapsulated) acids, acesulfame potassium salt, aspartame, lecithin, glycerin, flavor, mannitol, and sorbitol are then added to the mixer containing the molten gum base and combined to disperse the ingredients. The resultant chewing gum mixture is cooled and then processed into the desired chewing gum shape. The chewing gum is conditioned at 14° C. and 25 percent relative humidity for about one week prior to packaging the chewing gum.

Figure 2:
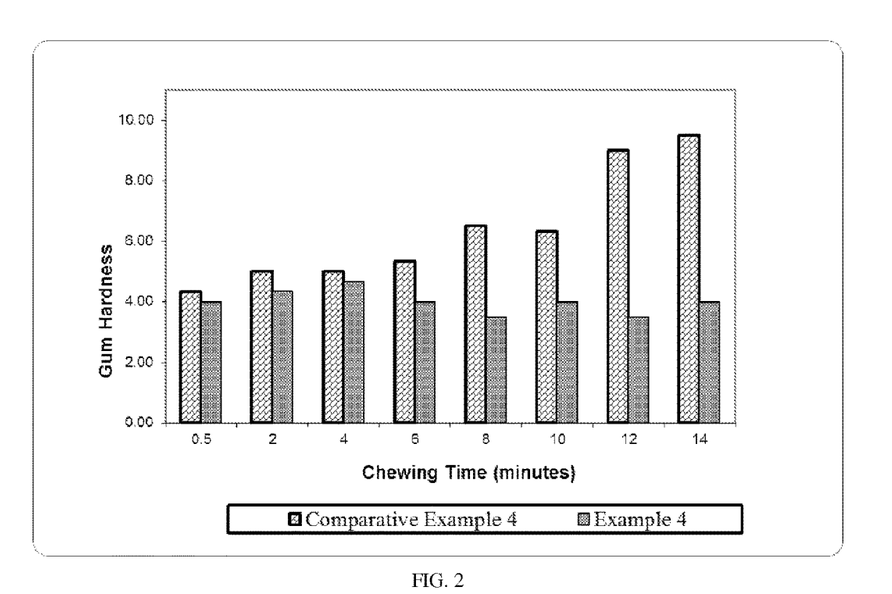
FIG. 2 is a bar chart of gum hardness as a function of chewing time for chewing gums containing (A) citric acid encapsulated with poly(vinyl acetate) alone, and (b) citric acid encapsulated with poly(vinyl acetate) and fatty acid salt.
Figure 3:
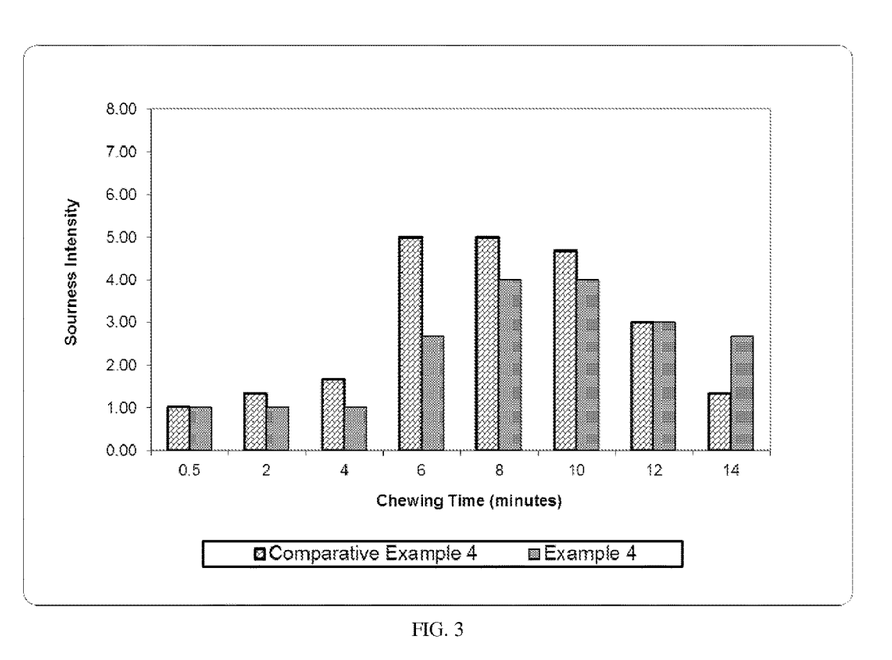
FIG. 3 is a bar chart of perceived sourness as a function of chewing time for chewing gums containing (A) citric acid encapsulated with poly(vinyl acetate) alone, and (b) citric acid encapsulated with poly(vinyl acetate) and fatty acid salt.

A sensory evaluation test panel evaluated the chewing gums of Example 7 and Comparative Example 7 for hardness and sourness as a function of chewing time. FIG. 2 is a bar chart of gum hardness as a function of chewing time for chewing gums containing (A) food-grade acid encapsulated with poly(vinyl acetate) alone, and (b) food-grade acid encapsulated with poly(vinyl acetate) and fatty acid salt. FIG. 2 shows that gum hardness increased substantially with chewing time for the chewing gum in which food-grade acid was encapsulated with poly(vinyl acetate) alone. In contrast, gum hardness was relatively constant and increased only modestly at long chewing time for the chewing gum in which food-grade acid was encapsulated with poly(vinyl acetate) and a fatty acid salt. FIG. 3 is a bar chart of perceived sourness as a function of chewing time for chewing gums containing (A) food-grade acid encapsulated with poly(vinyl acetate) alone, and (b) food-grade acid encapsulated with poly(vinyl acetate) and fatty acid salt. FIG. 3 shows, surprising, that encapsulation of food-grade acid with poly (vinyl acetate) and fatty acid salt yielded a longer lasting and more constant perceived sourness than encapsulation of food-grade acid with poly(vinyl acetate) alone.

TABLE 2

| | Ex. 7 | C. Ex. 7 |
|---|---|---|
| COMPOSITIONS | | |
| Gum Base | 39.00 | 39.00 |
| Sorbitol | 38.58 | 38.58 |
| Mannitol | 9.00 | 9.00 |
| Flavor | 3.67 | 3.67 |
| Glycerin | 1.50 | 1.50 |
| Lecithin | 0.20 | 0.20 |
| Aspartame | 0.70 | 0.70 |
| Acesulfame Potassium Salt | 0.35 | 0.35 |
| Citric Acid | 0.50 | 0.50 |
| Encapsulated Citric Acid of Ex. 2 | 3.00 | 0.00 |
| Encapsulated Citric Acid of C. Ex. 2 | 0.00 | 3.00 |
| Malic Acid | 0.50 | 0.50 |

TABLE 2-continued

| | Ex. 7 | C. Ex. 7 |
|---|---|---|
| Encapsulated Malic Acid of Ex. 3 | 3.00 | 0.00 |
| Encapsulated Malic Acid of C. Ex. 3 | 0.00 | 3.00 |

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A chewing gum composition comprising:
a gum base, a sweetener, and
an encapsulated food-grade acid comprising, based on the weight of the encapsulated food-grade acid,
about 30 to about 90 weight percent of a poly(vinyl acetate), wherein the poly(vinyl acetate) has a weight average molecular weight from 80,000 to about 300,000 atomic mass units;
about 5 to about 20 weight percent of a fatty acid salt, wherein the fatty acid salt is selected from the group consisting of a sodium salt of a $C_{12}$-$C_{36}$ aliphatic carboxylic acid, a potassium salt of a $C_{12}$-$C_{36}$ aliphatic carboxylic acid, a calcium salt of a $C_{12}$-$C_{36}$ aliphatic carboxylic acid, a zinc salt of a $C_{12}$-$C_{36}$ aliphatic carboxylic acid, a magnesium salt of a $C_{12}$-$C_{36}$ aliphatic carboxylic acid, an aluminum salt of a $C_{12}$-$C_{36}$ aliphatic carboxylic acid, and combinations thereof;
and about 5 to about 50 weight percent of a food-grade acid, wherein the food-grade acid is selected from the group consisting of adipic acid, ascorbic acid, aspartic acid, benzoic acid, citric acid, fumaric acid, glutamic acid, maleic acid, malic acid, oxalic acid, phosphoric acid, sorbic acid, succinic acid, tartaric acid, and mixtures thereof;

wherein the chewing gum composition further comprises the unencapsulated food-grade acid in an amount from 0.1 to 2.0 weight percent of the total weight of the chewing gum composition.

2. The chewing gum composition of claim 1, wherein the fatty acid salt comprises sodium stearate.

3. The chewing gum composition of claim 1, wherein the food-grade acid comprises citric acid.

4. The chewing gum composition of claim 1, wherein the food-grade acid comprises malic acid.

5. The chewing gum composition of claim 1, wherein the encapsulated food-grade acid comprises the fatty acid salt and the food-grade acid in a weight ratio of about 1:1 to about 1:10.

6. The chewing gum composition of claim 1, wherein the encapsulated food-grade acid comprises the fatty acid salt and the poly(vinyl acetate) in a weight ratio of about 1:1.5 to about 1:20.

7. The chewing gum composition of claim 1, wherein the encapsulated food-grade acid comprises the food-grade acid and the poly(vinyl acetate) in a weight ratio of about 1:1 to about 1:5.

8. The chewing gum composition of claim 1, wherein the chewing gum composition comprises the encapsulated food-grade acid and the gum base in a weight ratio of about 1:12 to about 1:3.

9. The chewing gum composition of claim 1, wherein the fatty acid salt consists of sodium stearate;

wherein the food-grade acid is selected from the group consisting of citric acid, malic acid, and a combination thereof;

wherein the encapsulated food-grade acid comprises the fatty acid salt and the food-grade acid in a weight ratio of about 1:2 to about 1:8;

wherein the encapsulated food-grade acid comprises the fatty acid salt and the poly(vinyl acetate) in a weight ratio of about 1:2.5 to about 1:15;

wherein the encapsulated food-grade acid comprises the food-grade acid and the poly(vinyl acetate) in a weight ratio of about 1:1.2 to about 1:3;

wherein the encapsulated food-grade acid has a number average particle size less than or equal to 420 micrometers;

wherein the chewing gum composition comprises the encapsulated food-grade acid and the gum base in a weight ratio of about 1:12 to about 1:3; and wherein the chewing gum composition further comprises the unencapsulated food-grade acid in an amount from 0.1 to 2.0 weight percent of the total weight of the chewing gum composition.

10. The chewing gum composition of claim 1, wherein the poly(vinyl acetate) is present in an amount of about 50 weight percent, wherein the fatty acid salt is present in an amount of about 10 weight percent, and wherein the food-grade acid is present in an amount of about 40 weight percent.

11. The chewing gum composition of claim 1, wherein a bolus produced by chewing the chewing gum composition for 10 minutes is no harder than a corresponding bolus produced after 10 minutes of chewing a corresponding chewing gum composition lacking the encapsulated food-grade acid.

\* \* \* \* \*